(12) United States Patent
Su

(10) Patent No.: US 10,525,997 B1
(45) Date of Patent: Jan. 7, 2020

(54) HAND TRUCK

(71) Applicant: Chung-Hsiu Su, Kaohsiung (TW)

(72) Inventor: Chung-Hsiu Su, Kaohsiung (TW)

(*) Notice: Subject to any disclaimer, the term of this patent is extended or adjusted under 35 U.S.C. 154(b) by 0 days.

(21) Appl. No.: 16/199,317

(22) Filed: Nov. 26, 2018

(51) Int. Cl.
  *B62B 1/14* (2006.01)
  *B62B 1/26* (2006.01)
  *B62B 5/06* (2006.01)

(52) U.S. Cl.
  CPC ............... *B62B 1/14* (2013.01); *B62B 1/264* (2013.01); *B62B 5/06* (2013.01); *B62B 2202/02* (2013.01); *B62B 2203/44* (2013.01); *B62B 2203/70* (2013.01)

(58) Field of Classification Search
  CPC ............ B62B 1/142; B62B 1/264; B62B 1/14
  See application file for complete search history.

(56) References Cited

U.S. PATENT DOCUMENTS

| | | | | |
|---|---|---|---|---|
| 1,255,070 A | * | 1/1918 | Waller | B62B 1/142 280/47.23 |
| 2,611,498 A | * | 9/1952 | Broersma | B66F 9/184 414/620 |
| 3,038,620 A | * | 6/1962 | Collin | B66C 3/16 294/107 |
| 4,685,854 A | * | 8/1987 | Bulle | B62B 1/12 280/47.24 |
| 4,793,623 A | * | 12/1988 | Talbot | B62B 1/142 280/47.24 |
| 6,530,584 B1 | * | 3/2003 | Lucy | B62B 1/142 280/47.29 |
| 6,883,766 B1 | * | 4/2005 | Ziaylek | A62B 9/04 248/154 |
| 2005/0129491 A1 | * | 6/2005 | Smith | B62B 1/142 414/490 |
| 2010/0021275 A1 | * | 1/2010 | Ratermann | B62B 1/14 414/454 |
| 2017/0183042 A1 | * | 6/2017 | Eagan, Jr. | B62B 1/264 |

* cited by examiner

Primary Examiner — Jonathan Snelting
(74) Attorney, Agent, or Firm — Thomas | Horstemeyer, LLP

(57) ABSTRACT

A hand truck includes a main frame mechanism and a clamping mechanism. The main frame mechanism includes a main frame unit configured to carry an article, and a wheel unit connected to the main frame unit for moving the main frame unit. The clamping mechanism includes two clamping frame units disposed movably and respectively on left and right sides of the main frame unit. The clamping frame units are driven to move relative to the main frame unit between a clamped state and an unclamped state, in which the clamping frame units are moved close to and away from each other to clamp and release therebetween the article, respectively.

8 Claims, 5 Drawing Sheets

HAND TRUCK

FIELD

The disclosure relates to a transport vehicle, more particularly to a hand truck.

BACKGROUND

A hand truck is a common cargo handling tool, and has many types of structures for different requirements and uses. Basically, a conventional hand truck includes a frame for carrying articles, and a wheel mounted to the bottom of the frame. Another conventional hand truck is provided with a shovel plate on a bottom portion of the frame for shoveling and carrying articles stacked on the ground. By using the shovel plate to shovel the stacked articles, after which the frame is disposed inclinedly and rearwardly so that the carried articles can lean back against the frame, the purpose of transporting the articles can be achieved. However, this kind of conventional hand truck is inconvenient to use. During transport, the conventional hand truck is prone to wobble when passing on uneven ground, so that the stacked articles are likely to fall sideways.

SUMMARY

Therefore, an object of the present disclosure is to provide a hand truck that can alleviate at least one of the drawbacks of the prior art.

Accordingly, a hand truck of this disclosure includes a main frame mechanism and a clamping mechanism. The main frame mechanism includes a main frame unit generally extending in a top-bottom direction and configured to carry an article, and a wheel unit connected to the main frame unit for moving the main frame unit. The clamping mechanism includes two clamping frame units disposed movably and respectively on left and right sides of the main frame unit. The clamping frame units are driven to move relative to the main frame unit between a clamped state, in which the clamping frame units are moved close to each other to clamp therebetween the article carried by the main frame unit, and an unclamped state, in which the clamping frame units are moved away from each other to release the article.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
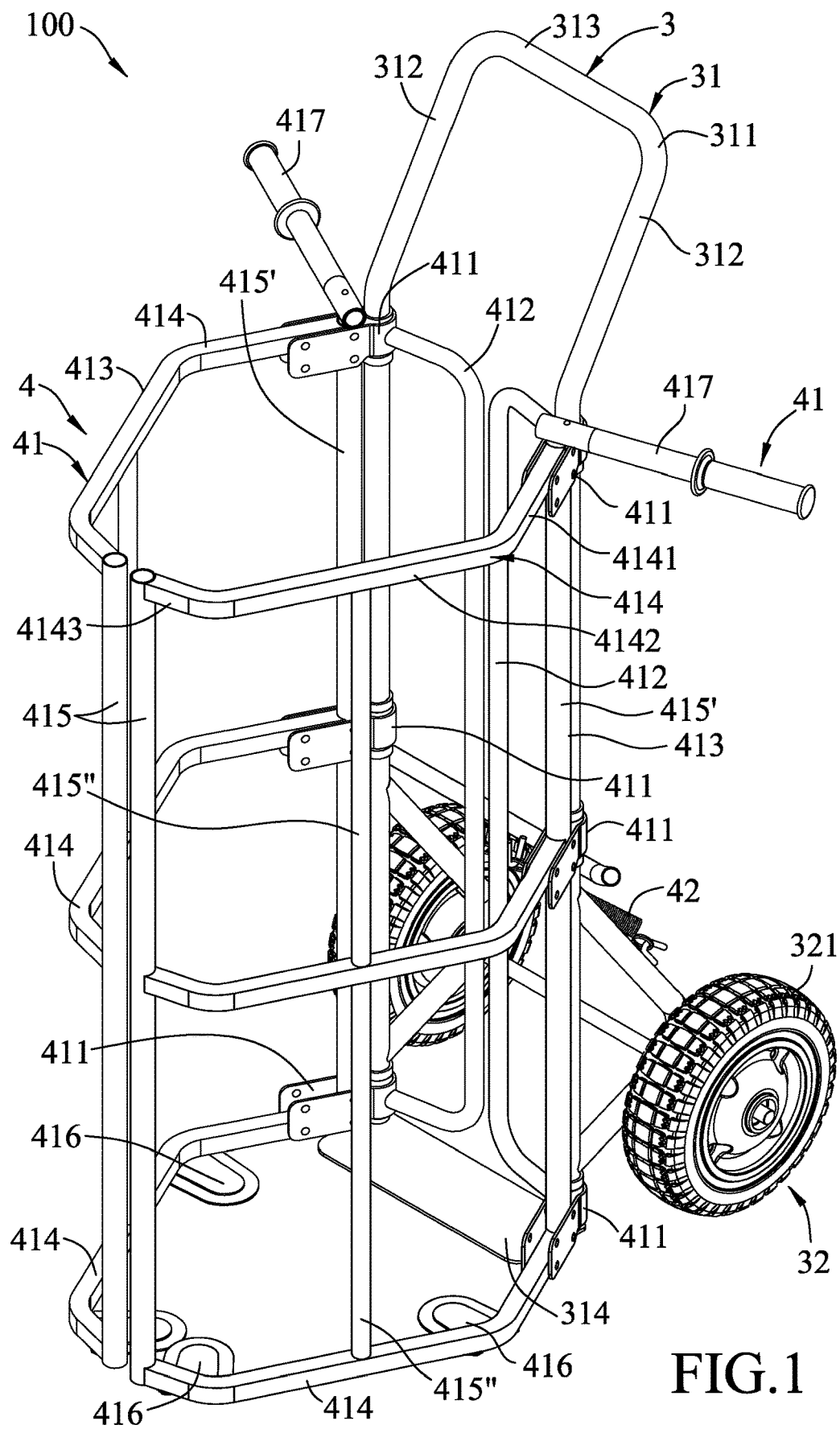
FIG. 1 is a perspective view of a hand truck according to an embodiment of this disclosure.
Figure 2:
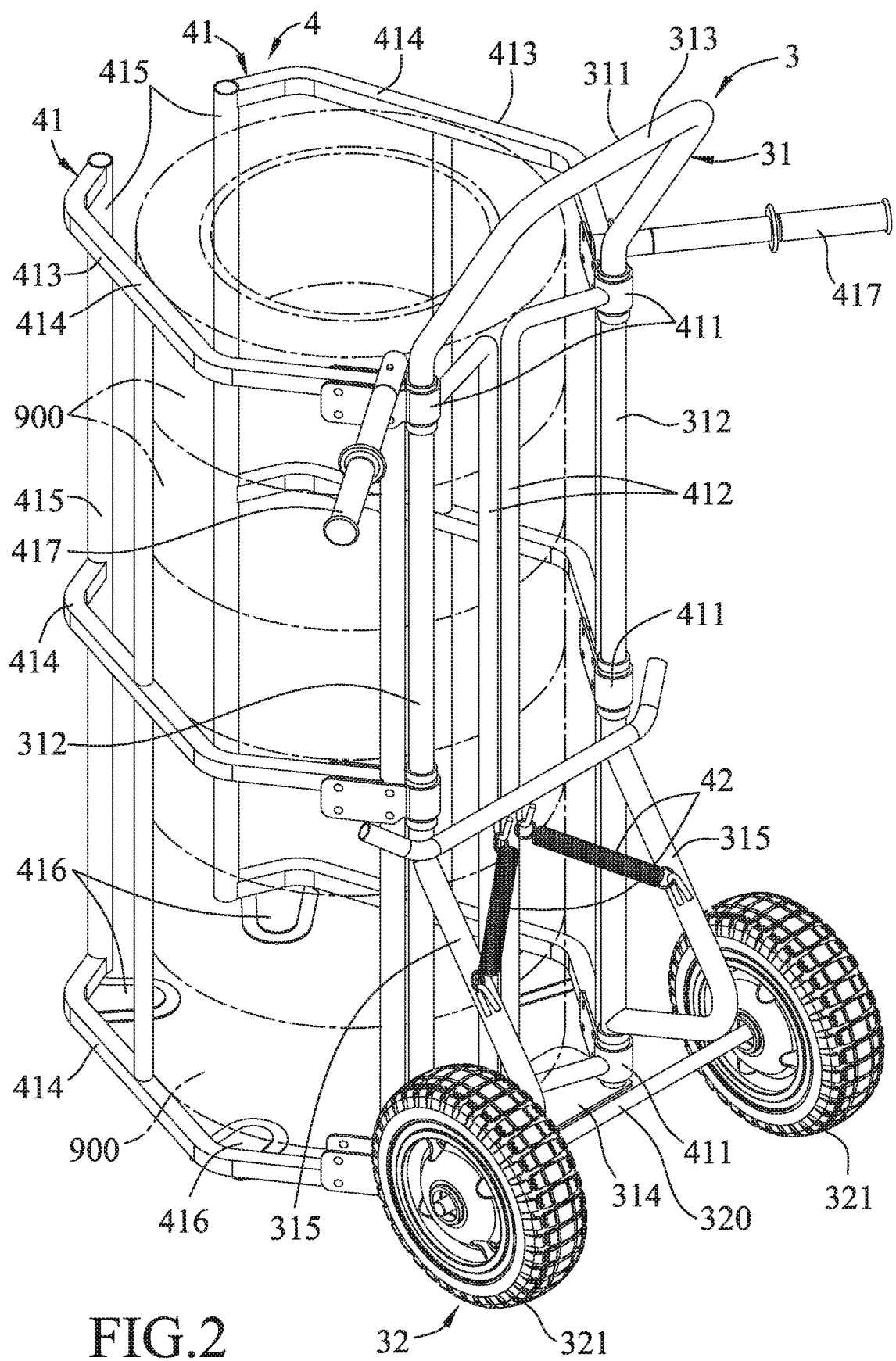
FIG. 2 is another perspective view of the embodiment taken from another angle.
Figure 3:
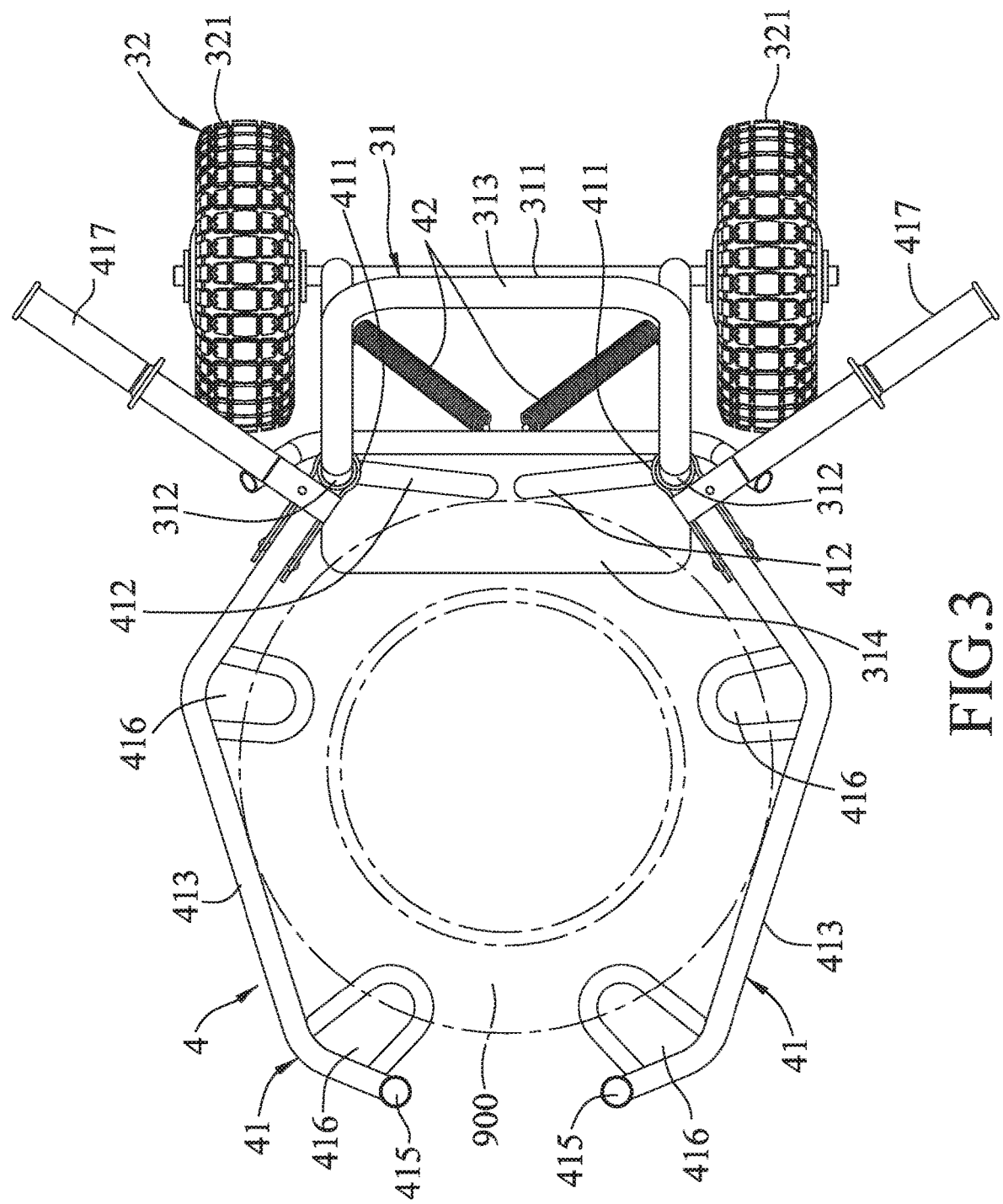
FIG. 3 is a top view of the embodiment.

Referring to FIGS. 1 to 3, a hand truck 100 according to an embodiment of the present disclosure is suitable for transporting articles 900, such as, but not limited to, tires or boxes, stacked in a top-bottom direction. The hand truck 100 includes a main frame mechanism 3, and a clamping mechanism 4 mounted to the main frame mechanism 3. For convenience of description, the left side and the right side of FIG. 3 are respectively defined as the front side and the rear side of the hand truck 100, and the left side and the right side of the hand truck 100 are defined accordingly.

The main frame mechanism 3 includes a main frame unit 31 generally extending in a top-bottom direction, and a wheel unit 32 connected to the main frame unit 31. The main frame unit 31 includes a main frame body 311 extending in the top-bottom direction, and a shovel plate 314 extending forwardly from a bottom end of the main frame body 311. The main frame body 311 includes two support rods 312 extending in the top-bottom direction and spaced apart in a left-right direction transverse to the top-bottom direction, a U-shaped handle member 313 having two opposite ends respectively connected to top ends of the support rods 312 such that the handle member 313 extends across the top ends of the support rods 312, and two substantially L-shaped rear connecting rods 315 each of which has two opposite ends connected to a bottom portion of a corresponding one of the support rods 312. The handle member 313 facilitates pushing and pulling of the hand truck 100. The shovel plate 314 has a rear side portion connected between bottom ends of the support rods 312 such that the shovel plate 314 extends across the bottom ends of the support rods 312, and a front side portion opposite to the rear side portion and configured to contact the ground. The wheel unit 32 has a shaft 320 connected to and extending across the rear connecting rods 315, and a pair of wheels 321 rotatably connected to two opposite ends of the shaft 320.

Figure 4:
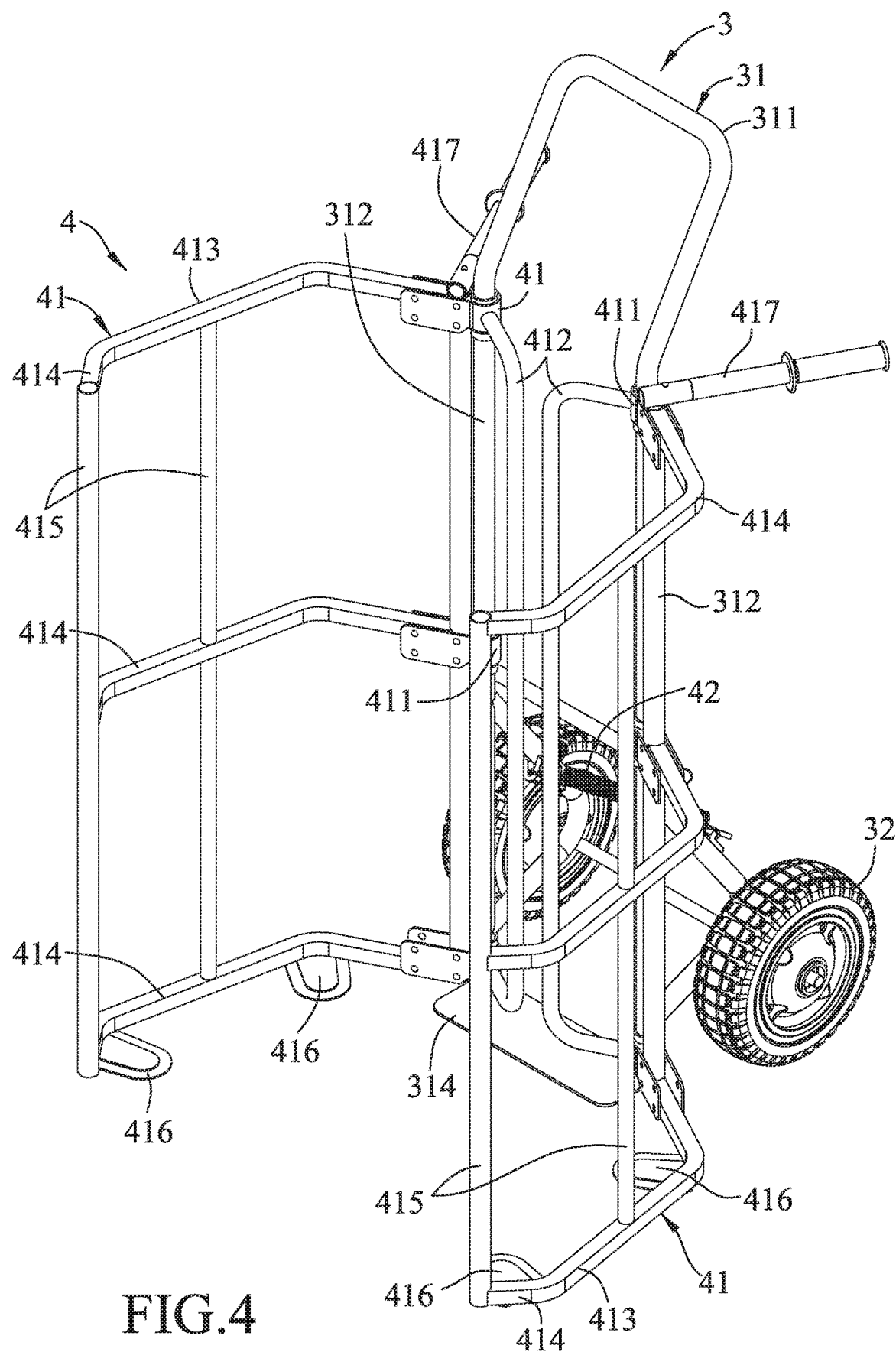
FIG. 4 is a view similar to FIG. 1, but illustrating clamping frame units of a clamping mechanism in an unclamped state.

Referring to FIG. 4, in combination with FIGS. 1 to 3, the clamping mechanism 4 includes two clamping frame units 41 disposed movably and respectively on left and right sides of the main frame body 311 and located above the shovel plate 314, and two spaced-apart elastic members 42 each of which is disposed between the main frame body 311 and a corresponding one of the clamping frame units 41. The clamping frame units 41 are respectively pivoted to the support rods 312, and are driven to move relative to the main frame body 311 between a clamped state, as shown in FIG. 1, and an unclamped state, as shown in FIG. 4. In the clamped state, the clamping frame units 41 are moved close to each other. In the unclamped state, the clamping frame units 41 are moved away from each other. Since the structures of the clamping frame units 41 are symmetrical, only the clamping frame unit 41 disposed on the right side of the main frame unit 31 will be described hereinafter for the sake of brevity.

The clamping frame unit 41 includes a plurality of pivot connecting members 411 pivoted to the support rod 312 and spaced apart along the length of the support rod 312, a push member 412 connected to and extending across the pivot connecting members 411 and protruding leftward toward the other clamping frame unit 41, a clamping frame body 413 fixed to the pivot connecting members 411 and protruding forwardly in front of the shovel plate 314, a plurality of limiting plates 416 fixed to a bottom end of the clamping frame body 413, and an operating rod 417 fixed to a top end of the clamping frame body 413 and protruding horizontally, inclinedly and rearwardly therefrom. In this embodiment, the push member 412 has a U-shaped body with two opposite ends respectively fixed to an upper and a lower pivot connecting members 411.

The clamping frame body 413 includes a plurality of horizontal rods 414 connected fixedly and respectively to the pivot connecting members 411 and extending horizontally and forwardly therefrom, and a plurality of vertical rods spaced apart in a front-rear direction transverse to the top-bottom direction and the left-right direction. In this embodiment, each horizontal rod 414 includes a first rod section 4141 extending forwardly, inclinedly, and outwardly from a corresponding one of the pivot connecting members 411 in a direction away from other clamping frame body 413, a second rod section 4142 extending forwardly, inclinedly and inwardly from the first rod section 4141, and a third rod section 4143 extending forwardly, inclinedly and inwardly from the second rod section 4142 toward the other clamping frame body 413. The vertical rods includes a front vertical rod 415 connected to and extending cross front ends of the horizontal rods 414, a rear vertical rod 415' connected to and extending across rear ends of the horizontal rods 414, and two middle vertical rods 415" each of which is connected between two adjacent ones of the horizontal rods 414 and each of which is located between the front and rear vertical rods 415, 415'.

The limiting plates 416 are fixed to a bottommost one of the horizontal rods 414, and are spaced apart along the length thereof. Each limiting plate 416 protrudes from the bottommost horizontal rod 414 toward the other clamping frame body 413, and is configured to contact the ground. The operating rod 417 is fixed to the clamping frame body 413, and protrudes horizontally, inclinedly and rearwardly from a topmost one of the horizontal rods 414 in a direction away from the other clamping frame body 413. The operating rod 417 can be pulled toward or away from the operating rod 417 of the other clamping frame unit 41 to drive the clamping frame body 413 to pivot relative to the main frame body 311 through the pivot connecting members 411 in a direction away from or toward the clamping frame body 413 of the other clamping frame unit 41 and to simultaneously cause the push member 412 to move forward or rearward relative to the main frame body 311 through the pivot connecting members 411.

With reference to FIG. 2, in this embodiment, each elastic member 42 is a tension spring, and has a front end fixed to one of the push members 412, and a rear end fixed to a corresponding one of the rear connecting rods 315. The elastic members 42 will bias the clamping frame bodies 411 toward the clamped state through the push members 412. When the clamping frame units 41 are shifted from the clamped state to the unclamped state, the elastic members 42 are stretched by the push members 412 to store restoring forces for restoring the push members 412 to their original positions. However, in other embodiment, the elastic members 42 may be other articles that can be elastically stretched, such as, but not limited to, elastic rubber.

Figure 5:
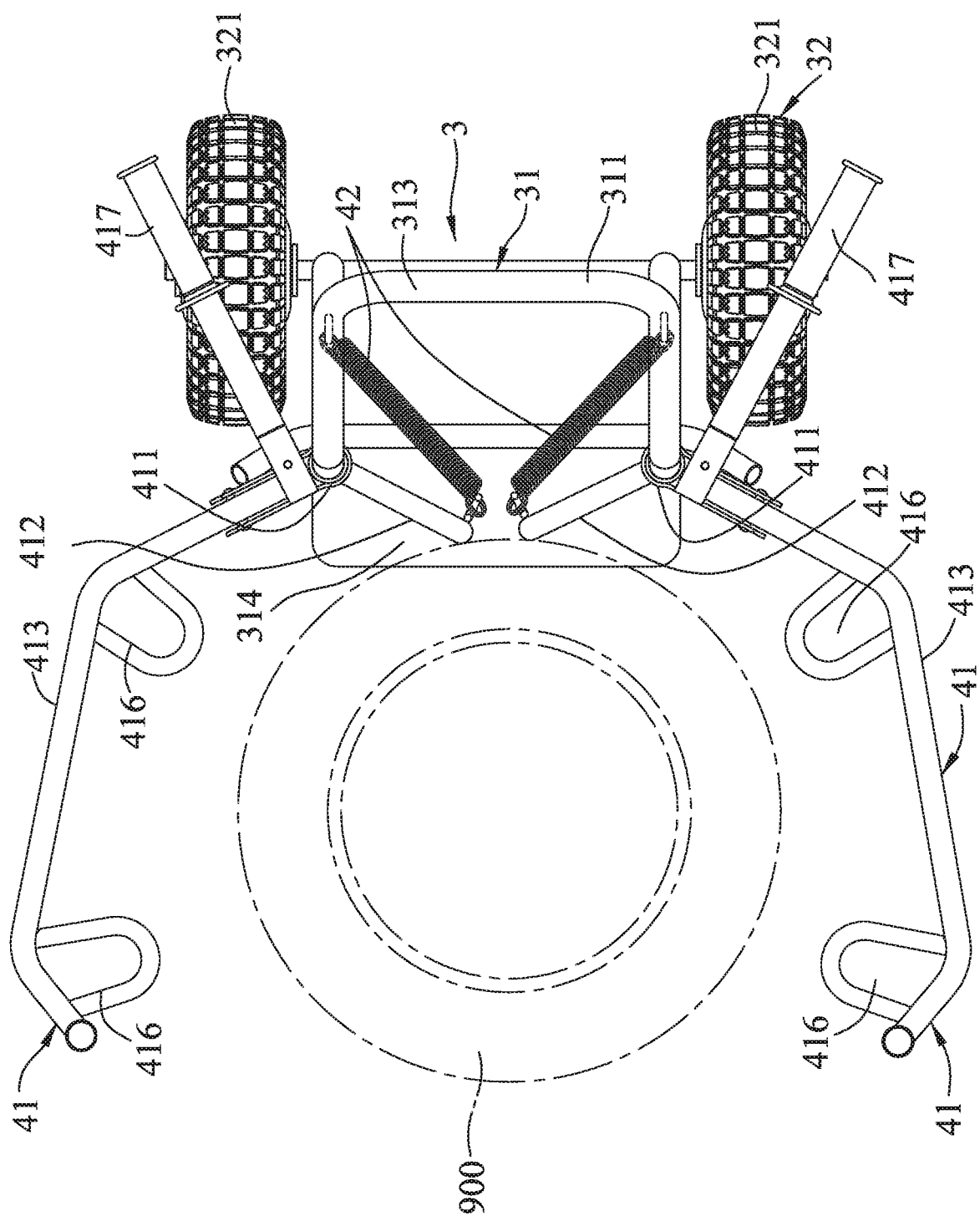
FIG. 5 is a view similar to FIG. 3, but illustrating the clamping frame units in the unclamped state.

Referring to FIG. 5, in combination with FIGS. 3 and 4, when the hand truck 100 of this disclosure is used for carrying a plurality of articles 900 stacked on the ground, the operating rods 417 of the clamping frame units 41 are first pulled toward each other to drive the clamping frame units 41 to pivot away from each other to the unclamped state and to simultaneously drive the push members 412 to pivot forwardly so as to be located directly above the shovel plate 314, after which the hand truck 100 is pushed forwardly toward the stacked articles 900 to move the shovel plate 314 to a bottom end of the lowermost article 900 for shoveling and carrying the stacked articles 900. The operating rods 417 are then released or are gradually moved away from each other, and the stacked articles 900 shoveled by the shovel plate 314 will push the push members 412 to move rearwardly, and in turn, the push members 412 will drive the clamping frame bodies 413 to pivot toward each other to the clamped state and clamp the stacked articles 900 therebetween. The movement of the clamping frame bodies 413 from the unclamped state to the clamped state will also drive the limiting plates 416 to shovel the bottom end of the lowermost article 900, so that the limiting plates 416 can cooperate with the shovel plate 314 to carry the stacked articles 900. At this time, the clamping frame units 41 cooperatively clamp the stacked articles 900 therebetween and limit the same on the shovel plate 314.

During movement of the operating rods 417 away from each other, the push members 412 are driven to pivot rearwardly through the restoring forces of the elastic members 42 and through the stacked articles 900 shoveled by the main frame unit 31, and the clamping frame bodies 413 are driven to clamp and surround the stacked articles 900. The limiting plates 416 are also driven to shovel the bottom end of the lowermost article 900 at the same time.

After the main frame unit 31 has shoveled the stacked articles 900 and the clamping frame units 41 are in the clamped state, the main frame unit 31 can be tilted rearwardly with the wheels 321 as fulcrums so that the stacked articles 900 can lean back against the main frame body 311 and the push members 412. The hand truck 100 can then be pushed forward or pulled rearward for transporting the stacked articles 900 to a predetermined location. Since the stacked articles 900 are pressing rearwardly against the push members 412, the clamping frame bodies 413 are forced to constantly remain in the clamped state, so that the stacked articles 900 can be stably limited by the clamping frame bodies 413 and can be prevented from falling sideways during transport.

After the stacked articles 900 are delivered to the predetermined location, the main frame unit 31 is pushed forwardly to an upright position with the wheels 321 as fulcrums and with the limiting plates 416 and the shovel plate 314 abutting against the ground. Next, the operating rods 417 are pulled toward each other to drive the clamping frame bodies 413 to pivot away from each other and to simultaneously drive the push members 412 to pivot forwardly, so that the stacked articles 900 can be released from clamping by the clamping frame bodies 413 and can be simultaneously pushed out of the shovel plate 314 by the push members 412. Afterwards, the main frame mechanism 3 is pulled rearwardly to move the clamping frame units 41 away from the stacked articles 900. Dismounting of the stacked articles 900 from the hand truck 100 is thus completed.

In this embodiment, the elastic members 42 are used to assist in driving the clamping frame units 41 to the clamped state. However, in actual practice, the elastic members 42 may be omitted. In this case, by directly using the rearward leaning of the stacked articles 900 against the push members 412 during transport of the stacked articles 900, the clamping frame units 41 can be driven to move toward each other and clamp the stacked articles 900 therebetween, thereby stably limiting the stacked articles 900 on the main frame unit 31.

In sum, because the clamping frame units 41 are mounted on the left and right sides of the main frame unit 31 and can be pivoted toward each other to clamp the stacked articles 900 therebetween, the stacked articles 900 can be stably limited on the main frame unit 31, so that the stacked articles 900 will not fall sideward during transport thereof. The hand truck 100 of this disclosure is quite convenient and practical to use, and has an innovative design. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hand truck comprising:
a main frame mechanism including a main frame unit generally extending in a top-bottom direction and configured to carry an article, and a wheel unit connected to said main frame unit for moving said main frame unit, said main frame unit including a main frame body extending in the top-bottom direction, and a shovel plate extending forwardly from a bottom end of said main frame body for shoveling a bottom end of the article and for carrying the article; and
a clamping mechanism including two clamping frame units respectively pivoted to left and right sides of said main frame unit and located above said shovel plate, each of said clamping frame units including at least one pivot connecting member pivoted to said main frame body, a Push member connected to said at least one pivot connecting member and extending toward the other one of said clamping frame units, and a clamping frame body fixed to said at least one pivot connecting member and protruding forwardly in front of said shovel plate, said clamping frame units being driven to move relative to said main frame unit between a clamped state, in which said clamping frame bodies of said clamping frame units are pivoted toward each other for clamping therebetween the article carried by said main frame unit and for limiting the article on said shovel plate, and an unclamped state, in which said clamping frame bodies of said clamping frame units are pivoted away from each other to release the article, and said push members of said clamping frame units are driven to pivot forwardly and push the article away from said shovel plate;
wherein each of said clamping frame units further includes a limiting plate that protrudes from a bottom end of said clamping frame body toward said clamping frame body of the other one of said clamping frame units and that is driven by said clamping frame body for shoveling the bottom end of the article, said limiting plate cooperating with said shovel plate to carry the article.

2. The hand truck as claimed in claim 1, wherein said main frame body includes two support rods extending in the top-bottom direction and spaced apart in a left-right direction transverse to the top-bottom direction, said shovel plate being connected between bottom ends of said support rods and extending forwardly from said bottom ends of said support rods, each of said clamping frame units including a plurality of said pivot connecting members pivoted to a corresponding one of said support rods and spaced apart along a length of the corresponding one of said support rods, said push member of each of said clamping frame units being connected to and extending across said pivot connecting members, said clamping frame body of each of said clamping frame units extending in the top-bottom direction and being fixed to said pivot connecting members.

3. The hand truck as claimed in claim 2, wherein said clamping frame body of each of said clamping frame units includes a plurality of horizontal rods respectively connected to said pivot connecting members, and a plurality of vertical rods extending across said horizontal rods and spaced apart in a front-rear direction transverse to the top-bottom direction and the left-right direction.

4. The hand truck as claimed in claim 3, wherein each of said horizontal rods has a first rod section extending forwardly, inclinedly, and outwardly from a corresponding one of said pivot connecting members in a direction away from said clamping frame body of the other one of said clamping frame units, a second rod section extending forwardly, inclinedly and inwardly from said first rod section, and a third rod section extending forwardly, inclinedly and inwardly from said second rod section toward said clamping frame body of the other one of said clamping frame units.

5. The hand truck as claimed in claim 3, wherein each of said clamping frame units further includes a limiting plate that protrudes from a bottommost one of said horizontal rods toward said clamping frame body of the other one of said clamping frame units and that is driven by said bottommost one of said horizontal rods for shoveling the bottom end of the article, said limiting plate cooperating with said shovel plate to carry the article.

6. A hand truck comprising:
a main frame mechanism including a main frame unit generally extending in a top-bottom direction and configured to carry an article, and a wheel unit connected to said main frame unit for moving said main frame unit, said main frame unit including a main frame body extending in the too-bottom direction, and a shovel plate extending forwardly from a bottom end of said main frame body for shoveling a bottom end of the article and for carrying the article; and
a clamping mechanism including two clamping frame units respectively pivoted to left and right sides of said main frame unit and located above said shovel plate, each of said clamping frame units including at least one pivot connecting member pivoted to said main frame body, a push member connected to said at least one pivot connecting member and extending toward the other one of said clamping frame units, and a clamping frame body fixed to said at least one pivot connecting member and protruding forwardly in front of said shovel plate, said clamping frame units being driven to move relative to said main frame unit between a clamped state, in which said clamping frame bodies of said clamping frame units are pivoted toward each other for clamping therebetween the article carried by said main frame unit and for limiting the article on said shovel plate, and an unclamped state, in which said clamping frame bodies of said clamping frame units are pivoted away from each other to release the article, and said push members of said clamping frame units are driven to pivot forwardly and push the article away from said shovel plate;
wherein said clamping mechanism further includes two elastic members each of which is disposed between said main frame body and a corresponding one of said clamping frame units, said elastic members biasing said clamping frame units to the clamped state.

7. The hand truck as claimed in claim 6, wherein each of said elastic members is connected between said main frame body and said push member of the corresponding one of said clamping frame units, and biases said push member to pivot rearwardly relative to said main frame body.

8. The hand truck as claimed in claim 7, wherein each of said clamping frame units further includes an operating rod fixed to said damping frame body and protruding horizontally, inclinedly and rearwardly from said clamping frame body in a direction away from the other one of said clamping frame units, said operating rods of said clamping frame units being pulled toward each other to drive said clamping frame bodies away from each other, which in turn cause said push members of said clamping frame units to pivot forwardly relative to said main frame body, said elastic members being stretched to store restoring forces for restoring said push members to their original positions when said push members are pivoted forwardly relative to said main frame body.

* * * * *